United States Patent [19]

Naumann et al.

[11] Patent Number: 4,689,086
[45] Date of Patent: Aug. 25, 1987

[54] STABILIZED MAGNETIC PIGMENTS

[75] Inventors: Rolf Naumann; Jakob Rademachers; Gunter Buxbaum, all of Krefeld; Fritz Rodi, Moers; Karl Waid, Bornheim, all of Fed. Rep. of Germany

[73] Assignee: Bayer Aktiengesellschaft, Leverkusen, Fed. Rep. of Germany

[21] Appl. No.: 790,797

[22] Filed: Oct. 24, 1985

Related U.S. Application Data

[63] Continuation of Ser. No. 638,439, Aug. 7, 1984, abandoned.

[30] Foreign Application Priority Data

Aug. 26, 1983 [DE] Fed. Rep. of Germany ....... 3330767

[51] Int. Cl.$^4$ ......................... C09C 1/24; C09D 17/00
[52] U.S. Cl. ................... 106/290; 106/308 M
[58] Field of Search ........................... 106/290, 308 M

[56] References Cited

U.S. PATENT DOCUMENTS

| | | | |
|---|---|---|---|
| 3,389,105 | 6/1968 | Bolger | 106/290 |
| 3,520,676 | 7/1970 | Stahr | 75/0.5 |
| 3,959,032 | 5/1976 | Koester et al. | 148/105 |
| 4,076,890 | 2/1978 | Yamada et al. | 428/337 |
| 4,221,601 | 9/1980 | Augustin et al. | 106/193 J |
| 4,395,485 | 7/1983 | Kashiwagi et al. | 106/308 M |
| 4,420,330 | 12/1983 | Jakusch et al. | 427/127 |
| 4,434,009 | 2/1984 | Banba | 106/308 M |

FOREIGN PATENT DOCUMENTS

| | | |
|---|---|---|
| 54818 | 6/1982 | European Pat. Off. . |
| 1914137 | 1/1970 | Fed. Rep. of Germany . |
| 602933 | 8/1978 | Switzerland . |

Primary Examiner—Robert A. Wax
Attorney, Agent, or Firm—Sprung Horn Kramer & Woods

[57] ABSTRACT

Sensitive magnetic pigment particles enclosed in about 0.1 to 5% by weight of a polymeric material thereby preserving the pigment magnetic properties. Advantageously, the polymer, which serves as a packing, is at least one member selected from the group consisting of polycarbonates, polyacrylates, polymethacrylates, polyesters, polyethers, polyurethanes, polyvinyl compounds, polyvinylidene compounds and cellulose compounds. These are compatible with the matrices used to make magnetic tapes.

4 Claims, No Drawings

STABILIZED MAGNETIC PIGMENTS

This application is a continuation of application Ser. No. 638,439, filed Aug. 7, 1984, now abandoned.

This invention relates to magnetic pigments which are enclosed in polymeric materials to preserve their properties, to a process for the production thereof and to the use thereof for the production of magnetic information carriers.

In recent years, the search for improved magnetic recording media has led to the use of magnetic metal pigments which have to be extremely finely-divided in order to realize outstanding recording properties. However, such finely-divided metals tend to self-ignite spontaneously in air and tend to become corroded after being worked into lacquer binders in magnetic carrier materials.

Even magnetic pigments based on iron oxide exhibit a tendency towards self-oxidation if the iron is not present in the highest oxidation state, as is the case in magnetites or bertholoid iron oxides.

Thus, various methods have been proposed for stabilizing these magnetic pigments and to present them to the user in a form which is stable during handling.

This may be effected by careful partial oxidation of the product in a dry phase (DE-A No. 3,116,489, DE-A No. 2,028,536) or in suspensions (U.S. Pat. No. 3,520,676), by aftertreating the pigments with inorganic (DE-A No. 3,124,430) and/or organic substances (JA-A No. 54,082,324, JA-A No. 78 076,958), by using metal suspensions in organic solvents, by the use of so-called "master batches" or by a combination of these individual measures.

All these methods suffer from disadvantages. Either the stability of the products is low so that, when the material is processed in organic media, a serious element of danger arises due to self-ignition, or the magnetic substance is too greatly diluted because of large after treatment quantities which are required, the selection of formulation by the processors is greatly restricted, or an economic production is complicated by the great variety of master batch formulations which are necessary.

An object of the present invention is to provide magnetic pigments which are safe to handle in an optimum magnetic and corrosion-stable form.

All these requirements are met by magnetic pigments which are enclosed in polymeric materials to preserve their properties. The quantity of the polymeric materials, based on the quantity of magnetic pigments, is from 0.1 to 5% by weight, preferably from 0.2 to 2% by weight.

Stable polymeric materials which serve at the same time as a packaging material are particulary preferred. In one embodiment of the subject matter of the present invention which is particularly advantageous for the user, the polymeric materials are soluble and/or are capable of swelling in the preparations which are used for the production of magnetic recording media.

Unlike a master batch in which each particle is sheathed, magnetic pigments which are sheathed in this manner have the advantage of requiring a much smaller quantity of sheathing material. In the case of master batches, this quantity is from 10 to 30% by weight.

The polymeric material of the packing should be soluble and/or should be capable of swelling rapidly and completely in the magnetic lacquer, without disadvantageously affecting the pigment-binder interaction. Therefore, is must be a polymer or copolymer which, as a packing material, has good mechanical properties and which does not impair the effect of conventional binders with a good solubility or swelling ability in the lacquer.

Polymeric materials of polymers or mixed polymers which are primarily suitable for this purpose are selected from polycarbonates, polyacrylates, polymethacrylates, polyesters, polyethers, polyurethanes, polyvinyl compounds, polyvinylidene compounds and cellulose compounds. However, other polymers or mixed polymers are also possible. On the other hand, polyethylene, polypropylene or polystyrene are unsuitable when conventional organic binders are used.

Magnetic pigments in the present context include all magnetic pigments based on metals and metal oxides. However, magnetites, bertholoid iron oxides and/or metal pigments which substantially consist of iron are particularly preferred.

In the case of magnetic pigments which substantially consist of iron, it is advisable for these pigments to have an oxygen content of from 0.5 to 15% by weight, based on the magnetic pigment.

Such metal particles may be obtained by bringing the metal particles which are unstable in air to an oxygen content of from 0.5 to 15% by a careful thermal treatment in an atmosphere with an oxygen partial pressure which increases with time.

It has been found that stabilization of the metal pigments by partial oxidation produces materials which are easy to handle only if the pigments are tightly sealed by plastics packings. The expression "optimum product properties" is understood as referring to the corrosion stability during storage or after working into the lacquer binder, and the acquisition of magnetic data up to the finished magnetic information carrier.

This invention also provides a process for the production of the magnetic pigments according to this invention. This is achieved by enclosing the magnetic pigments in the polymeric material after the degree of oxidation has optionally been adjusted.

Of course, the process according to the present invention may be used for all types of magnetic pigments, whether they are in a highly pyrophoric condition, stabilized by partial oxidation or by an aftertreatment, or by a combination of these measures.

This process is particularly preferred for the preservation of the product properties of magnetic pigments which substantially consist of iron, in which case the magnetic pigments are brought to an oxygen content of from 0.5 to 15% by weight by a careful thermal treatment in an atmosphere having an oxygen partial pressure which increases with time, and are then enclosed by polymers as packaging material in a quantity of from 0.1 to 5%, by weight, which polymers consist of compounds selected polyacrylates, polymethacrylates, polyethers, polyurethanes, polyvinyl compounds, polyvinylidene compounds, cellulose compounds or mixtures thereof.

A particular advantage of this process lies in the preservation of good product properties. Whereas hitherto, when the stabilized product was stored in steel drums, a slow reduction in the metal content of the samples was observed, such an effect was not observed even in highly-pyrophoric unstabilized products when they were stored in sealed film bags.

The products according to the present invention are outstandingly suitable for the production of magnetic information carriers.

The advantages of this invention will now be indicated in the following examples which are not to be considered as restricting the inventive concept.

EXAMPLE 1

Products having different oxygen contents were produced by partial oxidation from a metal pigment, and were worked into magnetic tapes. Pieces were taken from the tapes and were subjected to a climatic test which lasted one week (60° C.; 92.5+5% relative air humidity) and the reduction in the tape remanence, the remanence loss, was determined as a measurement of the corrosion sensitivity of the pigment in the magnetic lacquer (Table 1).

This example shows, that neither sample A or C are useful products (because sample A shows insufficient corrosion resistance and sample C shows poor magnetization values), but sample B still exhibits problems concerning handling safety. This problem however can be overcome when the material is filled in bags made of a suitable polymeric material which can be processed in the lacquers used to prepare magnetic media.

EXAMPLE 2

A relatively large quantity of metal pigment having a specific BET surface of 35 m$^2$/g was adjusted to an oxygen content of 13% by careful anoxidation in a fluidized bed over a period of 15 hours, so that good corrosion properties and good magnetic properties were obtained. Partial quantities of the sample were incorporated into different film materials used as bags and processed in magnetic lacquer mixtures in comparison with an unstabilized starting sample and with an unpacked stabilized material. In each case, 1% by weight of film, based on pigment, was required for the film packing. Considerable safety precautions had to be taken when the unstabilized sample and the stabilized sample without a packing were process. The results of the tests of the finished magnetic tapes are given in Table 2. No deterioration of magnetic data or corrosion resistance can be observed comparing the packaged samples with the unpackaged partially oxidized one.

The film materials which were used are specified as follows:

Polycarbonate: produced on basis of 2,2-(4,4-dihydroxydiphenyl)-propane having an average molecular weight of 28,000

Polymethyl methacrylate: Waloplast PMMA film manufactured by Wolff Walsrode AG

Polyester-polyurethane: Waloplast PUR 212 film manufactured by Wolff Walsrode AG Polyether-polyurethane: Waloplast PUR 214 film manufactured by Wolff Walsrode AG.

TABLE 1

| Sample | O Content % | Magnetic values of the pigment BR/$\sigma$ [G·g$^{-1}$·cm$^3$] | 4$\pi$Is/$\sigma$ [G·g$^{-1}$ cm$^3$] | Remanence loss % | Condition of the pigment |
|---|---|---|---|---|---|
| A | 2 | 1170 | 1965 | 22.9 | Spontaneously pyrophoric |
| B | 10 | 954 | 1504 | 11.5 | Not yet stable during handling |
| C | 15 | 725 | 1165 | 7.0 | Stable during handling |

TABLE 2

| Anoxidation | Film material | Magnetic Measurements Coercive Force Oe | Orienting force Br/Bs | Climatic test R$_\nu$ |
|---|---|---|---|---|
| no | — | 1433 | 0.84 | 23:2 |
| yes | — | 1530 | 0.84 | 6.7 |
| " | polycarbonate | 1538 | 0.84 | 6.7 |
| " | polymethyl-methacrylate | 1533 | 0.85 | 6.6 |
| " | polyester-polyurethane | 1542 | 0.85 | 7.1 |
| " | polyether-polyurethane | 1531 | 0.82 | 6.7 |

R$_\nu$: remanence loss in %, caused climatically, after weathering the magnetic tape for one week at 60° C. and >90% relative humidity.

It will be appreciated that the instant specification and examples are set forth by way of illustration and not limitation, and that various modifications and changes may be made without departing from the spirit and scope of the present invention.

What is claimed is:

1. A package of sensitive magnetic pigment particles useful in the production of magnetic recording tapes comprising a mass of such particles enclosed in a common film of a polymeric material selected from the group consisting of polycarbonates, polyacrylates, polymethacrylates, polyesters, polyethers, polyurethanes, polyvinyl compounds, polyvinylidene compounds and cellulose compounds, wherein said polymeric material is soluble and/or capable of swelling in lacquer, the film comprising about 0.1 to 5% by weight of the pigment particles.

2. A package according to claim 1, wherein the pigments are magnetites, bertholoid iron oxides and/or metal pigments which substantially consist of iron.

3. A package according to claim 2, wherein the magnetic pigments are metal pigments which substantially consist of iron and have an oxygen content of about 0.5 to 15% by weight.

4. A package according to claim 1, wherein the film comprises about 0.2 to 2% by weight of the pigment particles, and the particles substantially consist of iron and have an oxygen content of about 0.5 to 15% by weight.

* * * * *